United States Patent [19]

Mojoli et al.

[11] Patent Number: 4,615,040
[45] Date of Patent: Sep. 30, 1986

[54] HIGH SPEED DATA COMMUNICATIONS SYSTEM

[75] Inventors: Luigi F. Mojoli, Vimercate; Angelo F. Olivieri, Dovera, both of Italy

[73] Assignee: Coenco Ltd., Great Britain

[21] Appl. No.: 620,580

[22] Filed: Jun. 14, 1984

[51] Int. Cl.⁴ .............................................. H04B 7/02
[52] U.S. Cl. ........................................ 375/40; 375/58; 375/60; 375/100; 375/103; 375/111; 455/59; 455/133
[58] Field of Search ............... 375/38, 40, 58, 60, 375/100, 103, 106, 111; 455/59, 61, 52, 133, 134, 135, 65, 307, 312; 371/36, 68; 340/825.01; 364/718, 726, 825; 328/14; 370/100

[56] References Cited

U.S. PATENT DOCUMENTS

| | | | |
|---|---|---|---|
| 3,794,921 | 2/1974 | Unkauf | 375/56 |
| 4,015,205 | 3/1977 | Ikeda et al. | 455/133 |
| 4,063,174 | 12/1977 | Das Gupta et al. | 375/40 |
| 4,246,655 | 1/1981 | Parker | 455/135 |
| 4,410,955 | 10/1983 | Burke et al. | 364/718 |
| 4,499,585 | 2/1985 | Mosley et al. | 375/38 |

OTHER PUBLICATIONS

Article entitled "An LSI FSSK (MSK) Modem", by R. Matyas, C. Jagger, S. Sunter and P. Jeans, published in 1981, IEEE.
Article entitled "A ROM Controlled LSI Sequencer for Digital Data Subscriber Loop Transmission Equipment" by T. Ohyama, T. Cotoda and A. Takada, published in 1981, IEEE.
Article entitled "An Integrated Circuit Digital Signal Processor" by J. Boddie, G. Daryanani, L. Eldumian, R. Gadenz, J. Thompson and S. Walters, published in 1980, IEEE.
Yoshida, Komaki, Morita, "System Design and New Techniques For An Over-Water 100 KM Span Digital Radio" (1983).
Carlton, "Digital Transmission Over Troposcatter Links Using Independent Sideband Diversity".
Campbell & R. P. Coutts, "Outage Prediction of Digital Radio Systems" (1982).
Bello, "A Troposcatter Channel Model", 17 IEEE Transactions on Communications Technology", Apr. 1969, at 130.
Wilkens, "Four-Port 2-GHz Digital Radio Provides 96 Message Circuits in 3.5 MHz without Multiplexer" (1975).
Feher, "Digital Modulation Techniques in an Interference Environment", 9 EMC Encyclopedia Series (Don White Consultants, Inc., 1984).
Feher, "Digital Communications: Microwave Applications" (Prentice-Hall Inc.), pp. 119–121.

*Primary Examiner*—Benedict V. Safourek
*Attorney, Agent, or Firm*—Brumbaugh, Graves, Donohue & Raymond

[57] ABSTRACT

An improved data transmission system has a transmitter which includes a modulator responsive to a synthesized modulating signal, which provides for transmission of data substreams on parallel subchannels, for example, by using subcarrier frequencies. At the receiver the subcarriers are received and data is selected from the received subcarriers at two diverse receivers. In addition, there are provided signals added to the transmitted data for retiming the data at the receiver.

35 Claims, 21 Drawing Figures

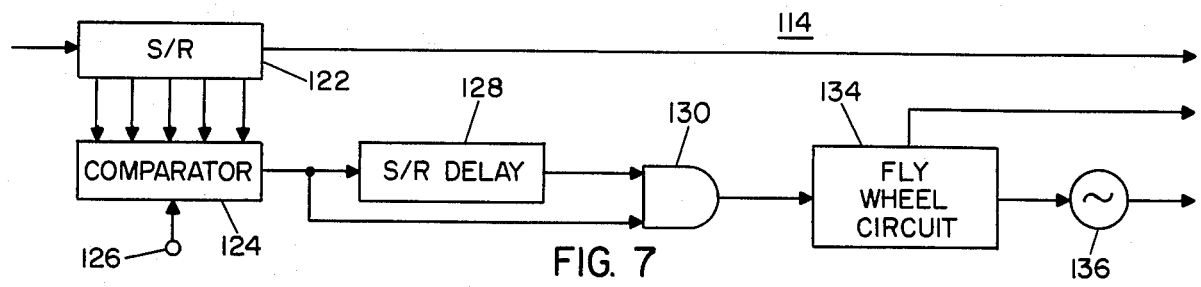
FIG. 7
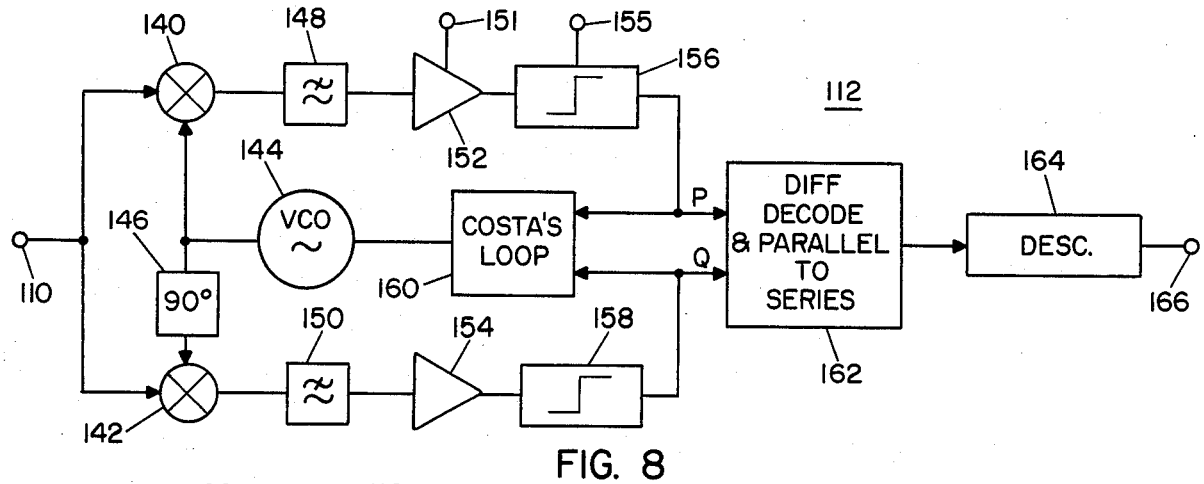
FIG. 8
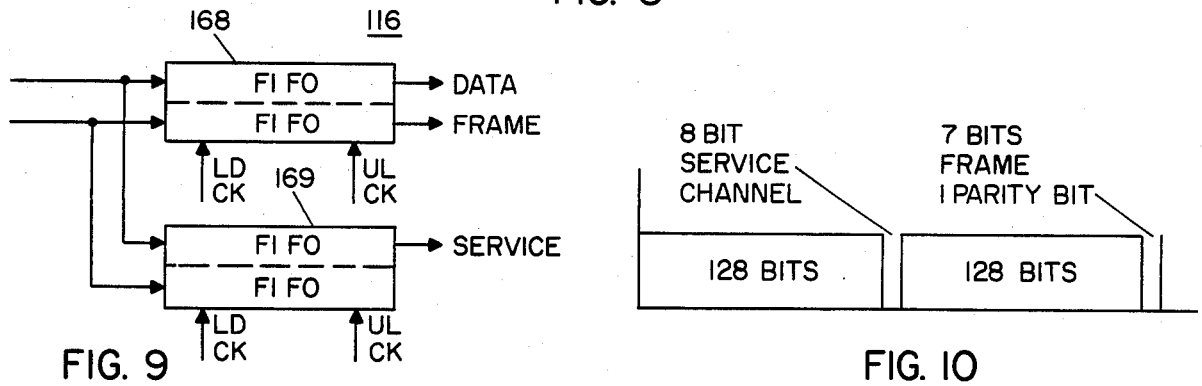
FIG. 9
FIG. 10
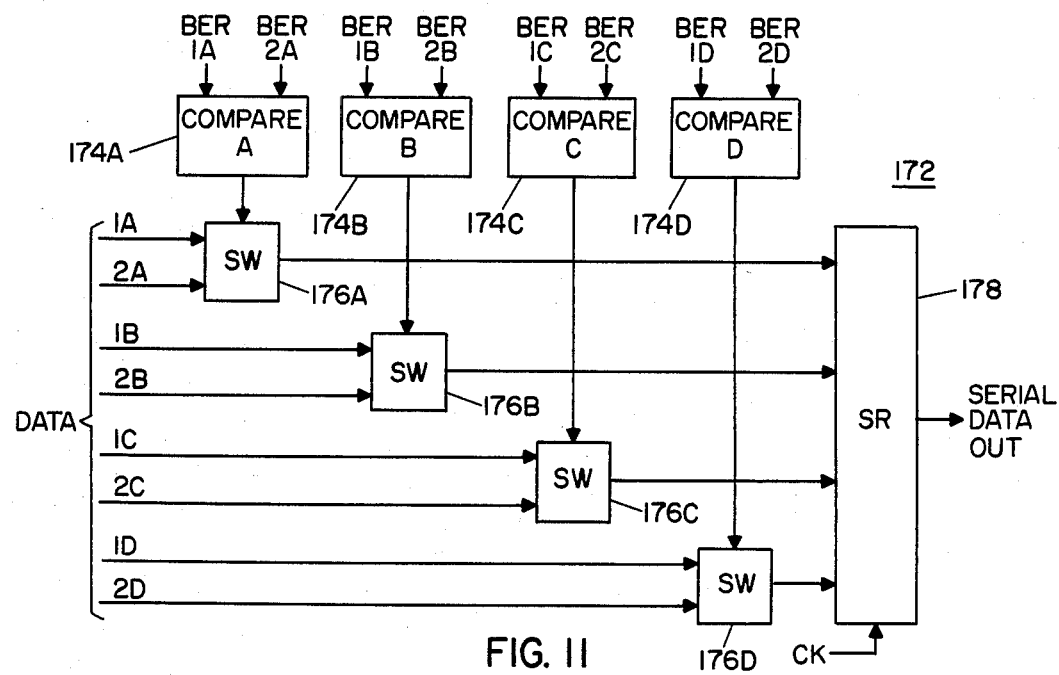
FIG. 11

HIGH SPEED DATA COMMUNICATIONS SYSTEM

BACKGROUND OF THE INVENTION

This invention relates to transmission of digital data, and particularly to transmission of data with high data rates over a dispersive medium.

Digital data, comprising either computer information or digitized analog information, such as digital signals derived from telephone channels, is often transmitted over line-of-sight microwave links or via tropospheric scattering links between a transmitter and a receiver. Typical links of this type are shown in simplified form in FIGS. 1 and 2.

FIG. 1 represents a line-of-sight communication link between a transmitting station 30 and a receiving station 32. Transmissions between the transmitter 30 and the receiver 32 follow both a line-of-sight path 34 and one or more time variant additional paths, such as path 36 which results from refractive effects of the atmosphere. There may also be transmission paths which result from ground or sea reflections. In the case of digital data transmission, difficulties arise in such a line-of-sight system where the mean delay of the second path 36 with respect to the first path 34 is greater than 0.02 times the symbol time of the data transmission.

FIG. 2 is a simplified illustration of a tropospheric scattering transmission system wherein a transmitter 38 transmits a signal which is scatterd by the troposphere and received by a remote receiver 40. In this type of system there are usually multiple paths between the transmitter 38 and the receiver 40. There are usually a sufficient number of transmission paths that transmission time differences among the paths cannot be easily defined, but is usually expressed in terms of an RMS delay related to the delay spectrum of the received power. For simplication, the drawing of FIG. 2 shows only two paths, labeled 42 and 44, but those skilled in the art will recognize that these are among a large number of present paths. In a tropospheric transmission system for digital signals, problems arise when the RMS deviation value of the delay spectrum exceeds 0.1 to 0.2 times the symbol time. Accordingly, high data transmission speeds also present difficulties in this type of system.

It has been suggested in a published article that multipath difficulties arising from the transmission of high speed digital data be alleviated by increasing the symbol time through the use of parallel transmission channels. In a paper entitled "System Design and New Techniques For an Overwater 100 Kilometer Span Digital Radio", the authors Yoshiva et al. describe a system wherein a stream of digital data at a rate of 200 megabits per second is divided into four substreams, each of which is transmitted on a different carrier using 16 QAM modulation. The effect of this design is not only to increase the symbol time by the use of the 16 QAM modulation technique, but also to increase the symbol time by providing a slower transmission rate of data on each of four subcarriers. The spectral characteristics of this system are illustrated in FIG. 3b.

If a signal is modulated onto a single carrier with a high data rate, a spectral characteristic of the transmitted signal will be a single broad spectrum about the carrier frequency, as illustrated by curve 46 in FIG. 3a. In the system described by Yoshiva et al., the data is modulated into four subcarriers 48A, 48B, 48C and 48D, each of which has a narrower spectral range because of the lower data rate of the signal. The present invention relates to a transmission system of this type, wherein digital data in a digital data stream is separated into substreams of data at a lower data rate. The substreams are used to separately modulate subcarriers or other component signals which are transmitted in parallel to a receiver at which the substreams are derived from component carriers and reassembled into an output data stream.

It is an object of the present invention to provide an improved transmissions system for the high speed transmission of digital data over a dispersive medium.

It is a further object of the present invention to provide such a system having improved diversity characteristics.

It is a further object of the present invention to provide such a system having a modulator which reduces intersymbol interference caused by components of the system.

It is a further object of the present invention to provide such a system having improved data stream timing techniques to enable the efficient reconstruction of a data stream following parallel transmission of data substreams on different channels.

SUMMARY OF THE INVENTION

In accordance with the present invention there is provided a system for transmission and reception of a serial stream of digital data from a first location to a second location. The system includes means at the first location for converting the serial data stream into a number N of first parallel data substreams. There is also provided a number N of modulators at the first location for modulating a plurality of component signals each with one of the parallel data substreams. Means are provided for transmitting the modulated component signals to the second location. Each of the component signals is transmitted to the second location by at least two transmission channels. At the second location there are provided at least 2 N demodulators, each for demodulating one of the component signals from one of the transmission channels. There is also provided at the second location a switching means for selecting the output of one of the demodulators for each of the modulated component signals thereby deriving a number N of second parallel data substreams each corresponding to one of the first data substreams. Finally, there is provided means for converting the N second parallel data substreams into an output serial data stream.

In an exemplary embodiment of the system, the modulators modulate a plurality of component signals each of which has a selected frequency within a frequency band. The component signals may be transmitted from the first location to the second location in the form of subcarriers of a composite signal. The two transmission channels between the first and second location may be channels which have different paths in space, different frequency bands or different polarities. The switching means may be responsive to signals which are representative of the amplitude of the component signals as received at the second location or may be responsive to signals derived from the received signals representing the bit error rate of the transmission channels for each component signal.

In accordance with another aspect of the present invention there is provided a system for the transmission of a serial stream of digital data from a first location to a second location. The system includes means at the first location which is responsive to the serial data stream for providing a plurality of N parallel data substreams, each of the substreams comprising a series of data frames, and each of the data frames including a data frame timing signal and a predetermined quantitiy of digital data. The first location is also provided with N modulators, each for modulating a component signal with one of the N data substreams. There is provided means for transmitting the modulated component signals to a second location wherein there is located N demodulators for demodulating the modulated component signals to derive therefrom the N parallel data substreams. Means are provided at the second location, responsive to the frame timing signals in the demodulated data substreams for retiming the digital data in the substreams, and there is provided means, responsive to the retimed substream digital data, for generating an output serial stream of digital data.

In a typical embodiment a frame timing signal comprises a selected sequence of digital bits, which is the same for each frame within a substream. The retiming means include a comparator for comparing the digital bits in each of the substreams to the selected sequence. The retiming means can also include means which are responsive to the timing signals in two or more sequential data frames. The retiming means can also include a first-in-first-out memory for digital data having separate data-in and data-out clock inputs, and having a first memory channel for data signals and a second memory channel for signals derived from the frame timing signals.

In accordance with another aspect of the present invention, useful in a system for transmission of a stream of digital data between remote locations, the system having signal filtering characteristics, there is provided signal forming apparatus which includes a register for storing digital data bits in the data stream in an arrangement corresponding to the order of the bits in the stream. There is also provided a counter responsive to supplied clock signals and a programmed digital data memory having first address inputs coupled to the register and second address inputs coupled to the counter. The programmed data values in the memory correspond to sequential values of a synthesized modulating signal. The data values are selected to provide a synthesized modulating signal with spectral characteristics dependent on the data bits in the register which compensate for the signal filtering characterisics of the system. Finally, there is provided a digital to analog converter responsive to data values from the memory.

The signal forming apparatus can be used to form a modulating signal which is used to modulate a carrier. In an exemplary embodiment the digital data bits occur at a bit clock rate, and the register comprises a shift register which is clocked at the bit clock rate. The counter can be an N-bit digital counter which is supplied with clock signals which occur at a rate which usually is $2^H$ times the bit clock rate. In a preferred embodiment the memory is programmed with data values which are selected to compensate for spectral amplitude and group delay characteristics of the system.

For a better understanding of the present invention, together with other further objects, reference is made to the following description, taken in conjunction with the accompanying drawings, and its scope will be pointed out in the appended claims.

BRIEF DESCRIPTION OF THE DRAWINGS

FIG. 7 is a block diagram of a frame timing signal detecting circuit useful in a receiver for a data communication system in accordance with the present invention.

FIG. 8 is a block diagram of a demodulator useful in a receiver for a data communication system in accordance with the present invention.

FIG. 9 is a block diagram of a data substream retiming arrangement useful in a receiver for a data communication system in accordance with the present invention.

FIG. 10 is a simplified diagram indicating the arrangement of a frame of data in a data sub-substream of a data communication system in accordance with the present invention.

FIG. 11 is a block diagram of a switching means useful in a receiver in a data communication system in accordance with the present invention.

DESCRIPTION OF THE INVENTION

Figure 1:
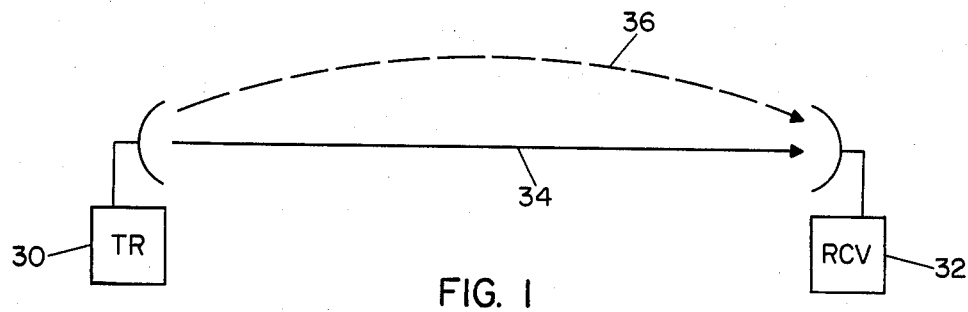
FIG. 1 is a simplified diagram of a data transmission system for line-of-sight communications showing multiple transmission paths.
Figure 2:
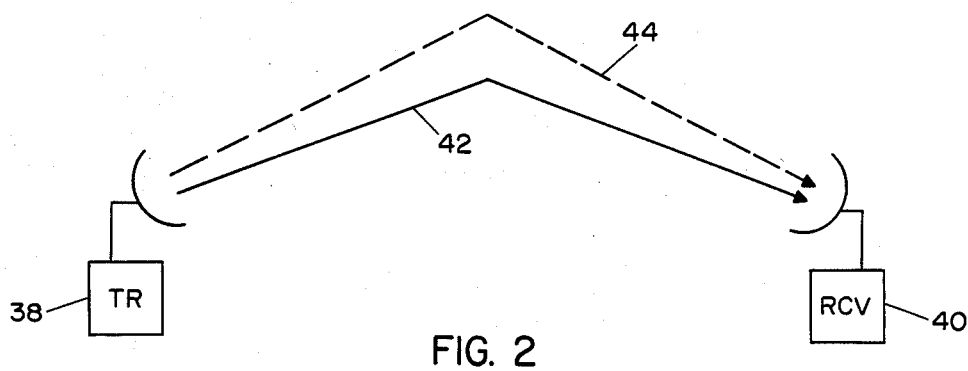
FIG. 2 is a simplified diagram of tropospheric data communication system showing multiple transmission paths.
Figure 3A:
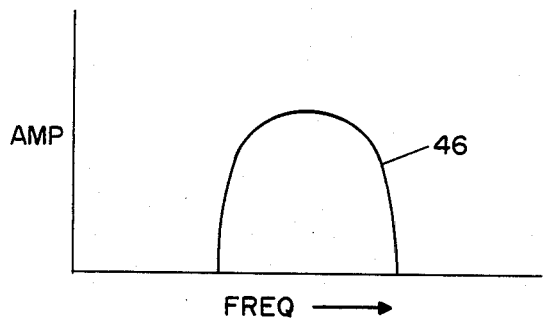
FIG. 3a is a graph showing spectral amplitude of a modulated signal for a data communication system signal using a single carrier.
Figure 3B:
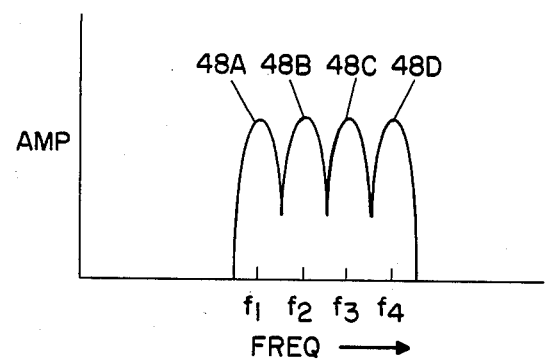
FIG. 3b is a graph showing spectral amplitude of a modulated composite signal for a data communication system using multiple modulated component subcarriers.
Figure 4:
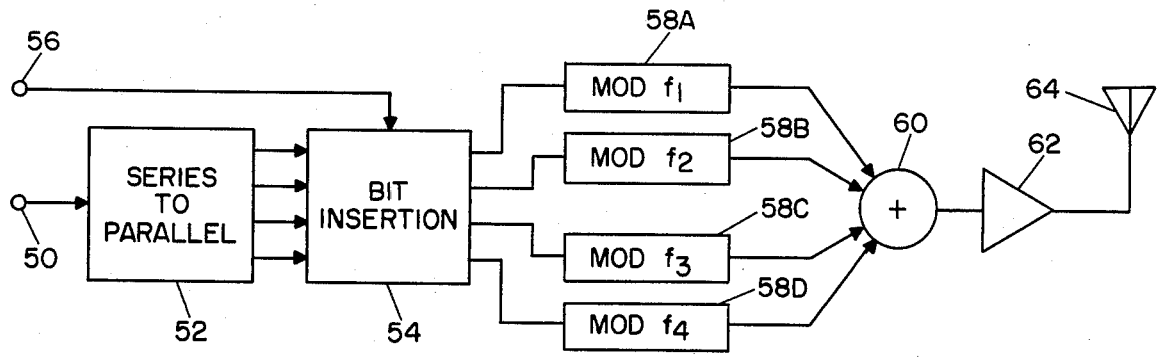
FIG. 4 is a block diagram of a transmitter for a data communication system, in accordance with the present invention.

The present invention will be described with reference to an exemplary embodiment, which is described in detail below and shown in FIGS. 4 through 20. Referring to FIG. 4 there is shown a block diagram of a transmitter in accordance with the invention for transmitting a serial stream of digital data. The digital data stream, for example, data at a rate of 2048 kilobits per second is provided to input terminal 50. The serial data stream is provided to a serial to parallel converter 52, which divides the data, bit by bit, into 4 data substreams each at a rate of 512 kilobits per second. The 4 data substreams are provided to bit insertion logic 54, which is also provided with data on a service channel at terminal 56. The 4 data substreams, with the additional inserted bits, as will be described, are thereafter provided to modulators 58A, 58B, 58C, and 58D. Each of these modulators is provided with a local oscillator intermediate frequency signal tuned at a different frequency. The different frequencies are designated f1, f2, f3 and f4. In the embodiment shown, these frequencies are:

f1 = 69,479 Khz.
f2 = 69,826 Khz.
f3 = 70,172 Khz.
f4 = 70,519 Khz.

Each of the modulators 58 in the FIG. 4 transmitter is of special design as will be described further in this application. The local oscillators provide component intermediate frequency carrier signals, which are modulated by modulators 58A through 58D to provide modulated component signals which comprise subcarriers which are combined in adder circuit 60. Following combination the subcarrier signals are up-converted, amplified in amplifier 62 and provided to transmitting antenna 64.

In accordance with one feature of the present invention, the system includes two different transmission channels between the transmitter location and the receiver location. Accordingly, it may be appropriate to provide one transmission channel which uses a signal with vertical polarization between a transmitting and a receiving antenna and a second transmission channel which uses horizontal polarization. In this case the same signal may be transmitted by the transmitter of FIG. 4 on both polarizations at a first location and separately received at a second location using a polarization sensitive antenna and two receivers. In another arrangement there may be provided a single transmitter, of the type shown in FIG. 4 at the first location, and two receivers at the second location, each connected to its own antenna, the two antennas being arranged with separation in space or receiving angle to provide what is known as space diversity or angle diversity. In still another arrangement there may be one transmitting antenna and one receiving antenna, and a second transmission channel may be provided by modulating a different carrier frequency with the subcarrier frequencies which are combined in adding circuit 60, so that the subcarrier frequencies are transmitted on two frequency separated RF channels. In some of these events only a single transmitter is necessary, while in other arrangements 2 transmitters may be used. In any event it is desirable to provide 2 or more separate receivers one for each transmission channel, as will be further discussed.

Figure 5:
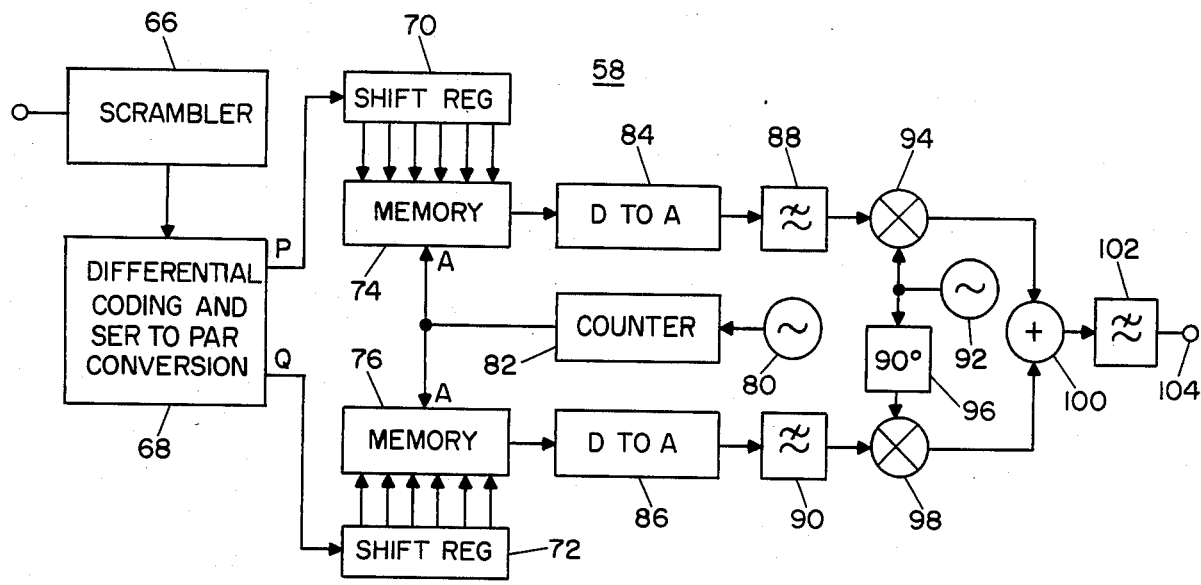
FIG. 5 is a block diagram of a modulator useful in a transmitter for a data communication system in accordance with the present invention.

FIG. 5 is a further detailed description of one of the modulators 58 which is used in the transmitter of FIG. 4. Each of the data substreams from the bit insertion circuit 54 is provided to a scrambler 66, and thereafter to a differential coding and serial to parallel conversion circuit 68. The scrambler 66 provides a randomization and scrambling of the bits in the serial data substream. The differential coding circuit provides differential bit-to-bit encoding and a conversion from the serial data substream to two serial data sub-substreams which are used for quadrature phase shift keying (QPSK) modulation in the embodiment of the modulator 58 shown in FIG. 5. The sub-substreams are designated P and Q for the in-phase and quadrature phase modulating signals, for QPSK modulation. The sub-substreams are at a rate approximately one eighth the rate of the data stream, providing a QPSK signal with a symbol rate slightly greater than 256 kilobits per second. The two sub-substreams are provided to shift registers 70 and 72, which are shifted to provide a parallel output of six time sequential bits of the data sub-substreams for the modulator. The shifting of shift registers 70 and 72 is offset in phase so that the QPSK modulated signal is offset in modulation to avoid zero amplitude transitions. The parallel outputs of shift registers 70 and 72 are provided as 6 bit address signals to memories 74 and 76. The parallel signals include the current phase shift data bit, three previous data bits and two subsequent data bits. Memories 74 and 76 have 9 address bit inputs, which includes the 6 bits of data from shift registers 70 and 72, as well as 3 bits of address information provided from counter 82. Counter 82 is cycled by clock 80, which is run at a rate which is 8 times the rate at which the bits are shifted in shift registers 70 and 72. Accordingly counter 82 cycles through the 3 output bits provided as addresses to memories 74, 76 during each shift of shift registers 70 and 72. Generally the rate for clock 80 is $2^M$ times the shift clock rate, where M is the number of bits in counter 82.

Memory 74 is programmed with data corresponding to the time sequential amplitude of a digitally synthesized modulating signal which is appropriate for the spectral transfer characteristics of the transmitter and receiver of the system of the present invention. The programming information in memories 74 and 76 each take into account the inter-symbol-interference which is caused by the preceding and following bits of data to be transmitted, which are included in the parallel data provided as address signals to memories 74 and 76, as well as the transfer characteristic of the filters used in the transmitter and the receiver of the invention. Accordingly, the modulating signal which is generated by D-to-A converters 84 and 86 is preconditioned to compensate for the signal spectrum transfer characteristics of the entire system. The programming of memories 74 and 76 is ideally arranged to satisfy the Nyquist criteria, that is, to have an equivalent transfer characteristic of the entire system, which has constant group delay and an amplitude of one-half at Nyquist frequency, and has a roll-off factor which follows a cosine roll-off pattern, with a roll-off factor of 0.4. Of special importance and benefit in the system of the present invention, this preconditioning is optimized for each modulated subcarrier signal and its associated filtering circuits. Prior art systems use filters which approximate Nyquist condition for the amplitude but not for group delay. Group delay equalizers are consequently inserted to reduce the group delay impairments. By synthesizing the modulating signal in the transmitter, by the use of programmed memories, it is possible to arrange the modulating signal to compensate not only for amplitude spectral characteristics of the system transfer function, but also for irregularities in the group delay characteristics of the system, and therefore to provide excellent correction by predistortion of the modulating signal for system anomalyes. Particularly important among these anomalyes are the effect of intersymbol interference caused by the various filters used in the system. The output of memories 74 and 76 are arranged with a one-half symbol time displacement for off-set QPSK to avoid a zero crossing of the two phase modulated signal. These output signals are in the form of 8 bits of digital information, which presents the amplitude of the synthesized modulating signal. The output of memory 74 is provided to D-to-A converter 84 and thereafter to smoothing filter 88. The output of smoothing filter 88 is provided to mixer 94 which is supplied with a local oscillator signal from oscillator 92. Likewise the output from memory 76 is provided by D-to-A converter 86 to smoothing filter 90 and mixer 98. The output of local oscillator 92 is provided to mixer 98 by 90° phase shift circuit 96 to provide for QPSK modulation of the intermediate frequency component carrier which is provided by oscillator 92. The in-phase and quadrature phase modulated component signals are combined in adder 100 and thereafter provided through low pass filter 102 to output terminal 104. The filter 102 is provided to eliminate higher harmonics of the IF signal frequency. Terminal 104 of FIG. 5 is provided as one of the inputs to adder circuit 60 of FIG. 4 wherein the four QPSK modulated component signals from modulators 58A through 58D are combined to provide a composite signal which is up-converted, amplified and transmitted via antenna 64.

Figure 12:
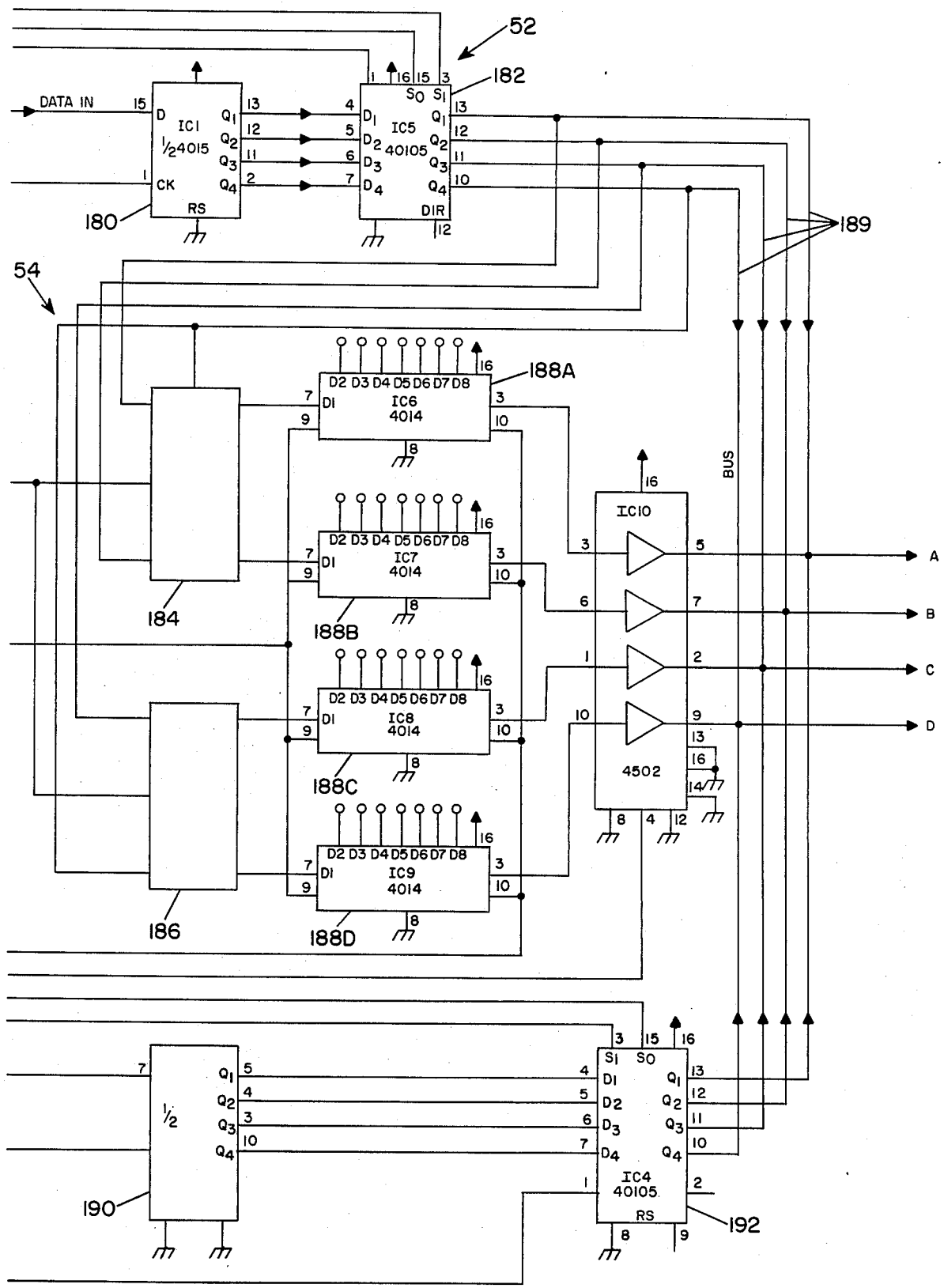
FIG. 12 is a schematic diagram of a series to parallel data conversion apparatus useful in a transmitter for a data communication system in accordance with the present invention.

Further details of circuits used in the transmitter of FIG. 4 are shown in FIGS. 12, 13, 14 and 15. FIG. 12 shows the series-to-parallel converter circuit 52, which includes a shift register 180 and a first-in-first-out memory 182. The first-in-first-out memory 182 is provided to enable a change in clock rate from the reconstructed, or provided, clock of the input serial data stream, to a clock rate which is slightly higher than one-quarter the original data clock rate, in order to enable the insertion into the data substreams of additional signals to provide for frame timing signals and service channel signals. In the illustrative embodiment the incoming data stream, which provides 2048 kilobits per second is divided by shift register 180 into four substreams at a rate of 512 kilobits per second. These substreams are provided to FIFO memory 182, which has a formatted output at the instantaneous rate of 544 kilobits per second. This output is divided into data bursts of 256 bits per burst, each burst having intervals for the provision of service channel data bits and frame timing signal bits. These burst are output on leads A, B, C and D corresponding to the four data substreams.

The devices connected to outputs A, B, C and D are three state devices, whereby the outputs can be provided with data substream signals from FIFO memory 182, timing and parity signals from shift registers 188A through 188D or service channel data signals from FIFO memory 192. The data substream signals which are output from FIFO memory 182 are provided to logic circuits 184 and 186 for the generation of parity bit signals. The parity bit signals are provided to shift registers 188A through 188D which are also provided with selected coding signals for the generation of frame timing signals. These are provided through buffer amplifiers of a three state type to output leads A, B, C and D. Service channel signals are provided by shift register 190 to FIFO memory 182, which is also a three state device connected to output leads A, B, C and D. The output on lines A, B, C and D are at a rate of 544 kilobits per second. These output signals are substreams which comprise frames of data substream signals, frame timing signals and service channel data signals. The substream rate is 544 kilobits per second and provides 512 kilobits per second of data, as well as 16 kilobits per second of frame timing and parity information and 16 kilobits per second of service channel information. Each frame is provided with a burst of 128 bits of data, followed by 8 bits of service channel, followed by a 128 bit data burst, followed by 7 bits of frame timing information and 1 parity bit.

The four substreams A, B, C and D are further divided into sub-substreams P and Q, as previously noted, in differential coding and series to parallel conversion circuit 68 so that each sub-substream modulates one phase of a component signal. Those skilled in the art know that proper differential coding allows the receiver to correctly recognize P and Q components. In the particular case of offset modulation, P and Q transitions are shifted in time and a simplified differential coding can be used.

Figure 13:
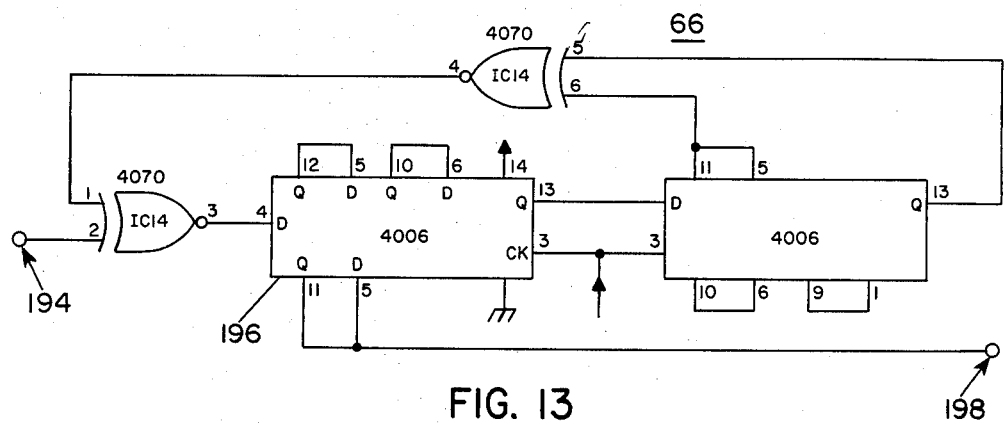
FIG. 13 is a circuit diagram of a scrambler useful in a transmitter for a data communication system in accordance with the present invention.

FIG. 13 shows a scrambling circuit 66 which is provided for each of the data substreams A, B, C and D. The scrambling circuit 66 is provided with a substream of data on input terminal 194 which is connected by logic circuitry to shift register 196. The output at terminal 198 is a scrambled data substream at the same rate. The scrambling of the data substream assures a randomization of transistions of digital data, which facilitates data transmission and synchronization at the receiver.

Figure 14:
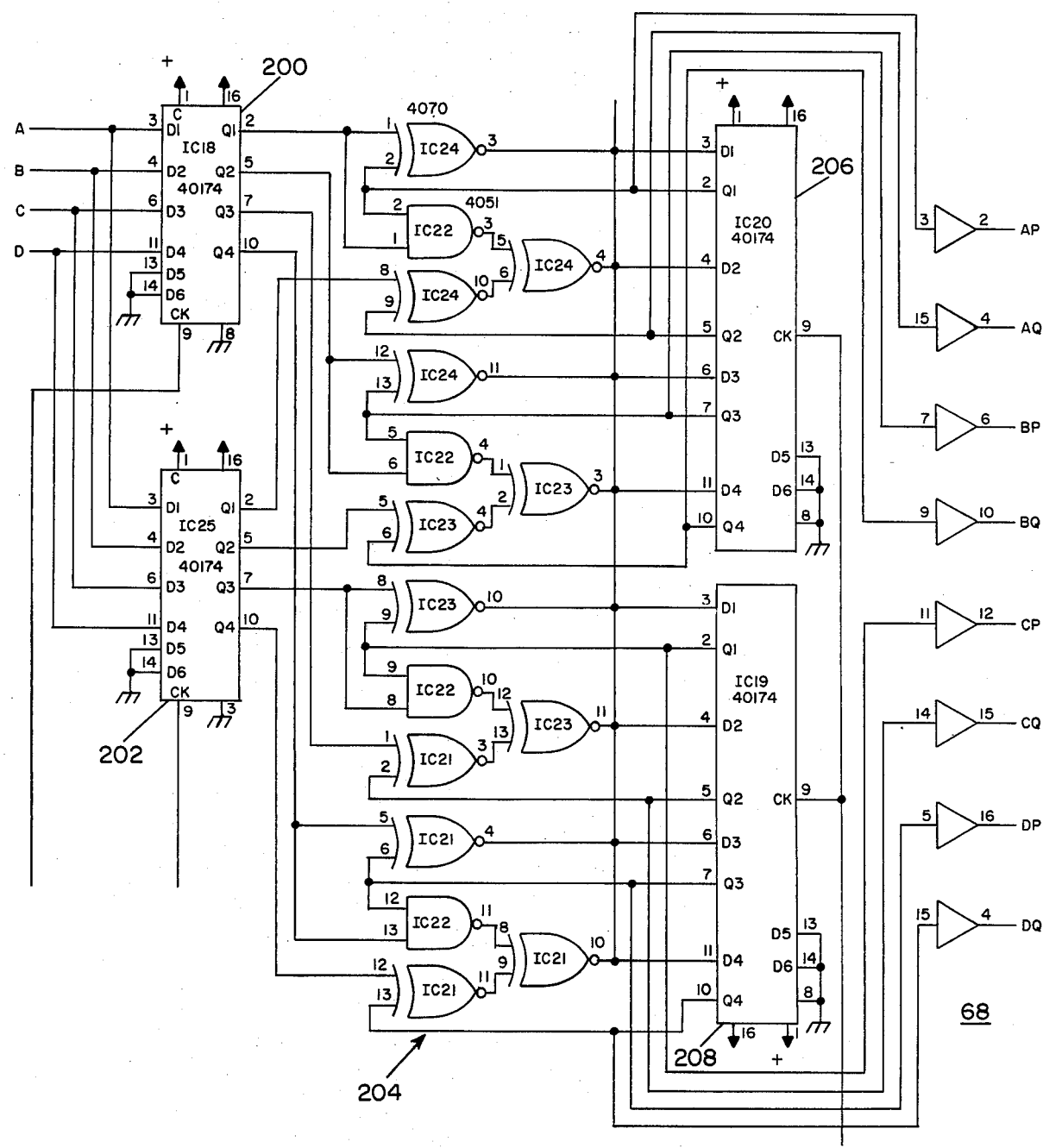
FIG. 14 is a schematic diagram of a series to parallel converter and differential coding circuit useful in a transmitter for a data communication system in accordance with the present invention.

Each of the data substreams A, B, C and D from scrambler output port 198 is provided to one of the labeled inputs A, B, C and D of the series to parallel converter and differential coding circuit 68 which is shown in FIG. 14. This circuit includes flip-flop integrated circuits 200 and 202, logic gates 204 and output flip-flip circuits 206 and 208. The outputs of this circuit, which are labeled AP, AQ, BP, BQ, etc. comprise the in-phase and quadrature phase modulating sub-substreams of digital data which include sequential frames as illustrated in FIG. 10. These sub-substreams are each provided to modulating circuits.

Figure 15:
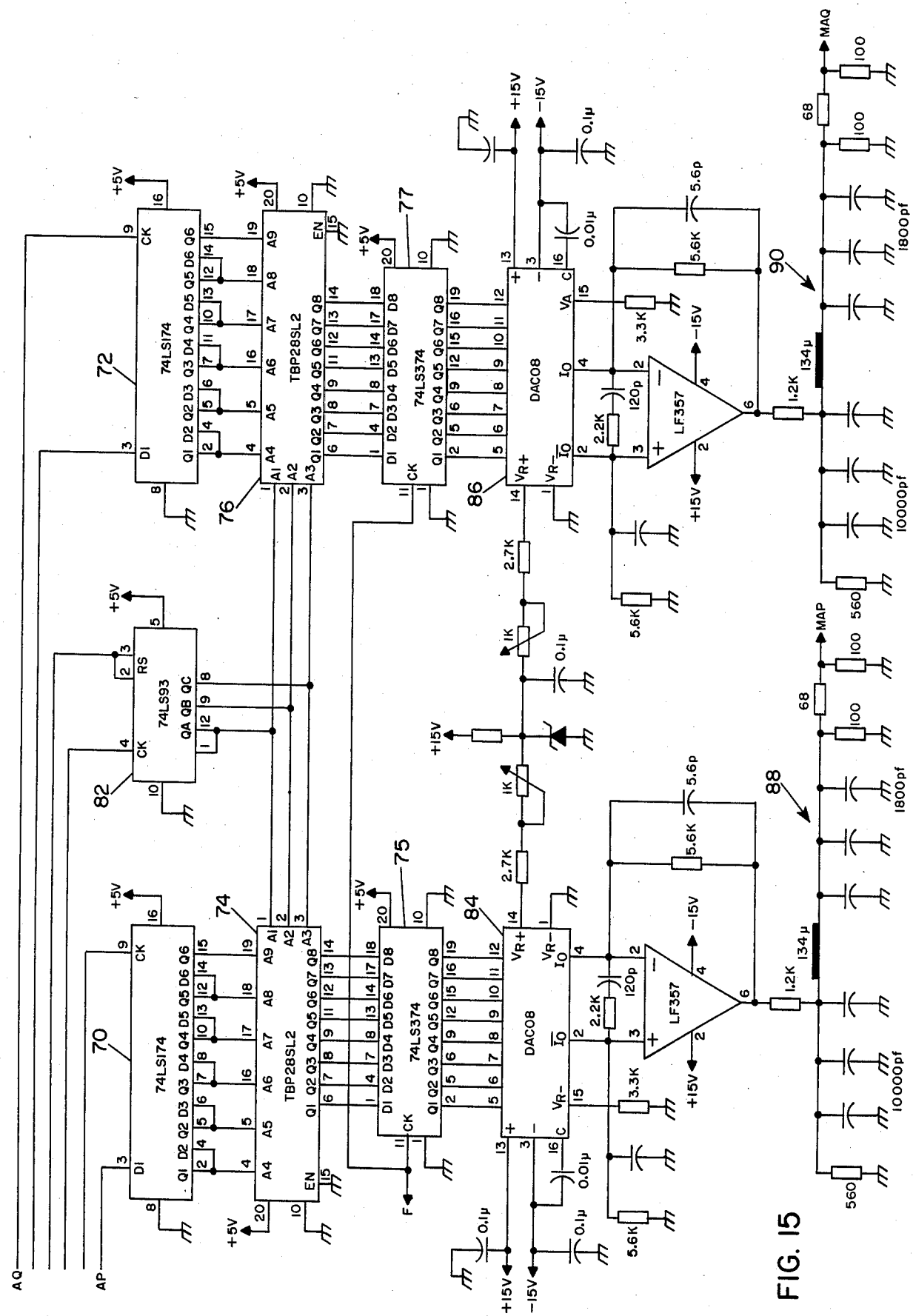
FIG. 15 is a circuit diagram showing a modulating circuit useful in a transmitter for a data communication system in accordance with the present invention.

A modulation signal synthesizing circuit for substream A is shown in FIG. 15. Similar circuits are provided for the other substreams. The circuit of FIG. 15 includes shift registers 70 and 72 which receive the in-phase and quadrature phase data sub-substreams for the A channel (signals AP and AQ). These data sub-substreams are output from shift registers 70 and 72 as parallel 6 bit information to address inputs of memories 74 and 76, which in the illustrated embodiment are programmable read-only memories. It should be understood that in some embodiments, adaptability of the circuits of the present invention may be provided by the use of random access memory in the circuit of FIG. 15, so that the memory contents may be changed for varying transmission conditions or varying operation of either the transmitter or the receiver.

Figure 16:
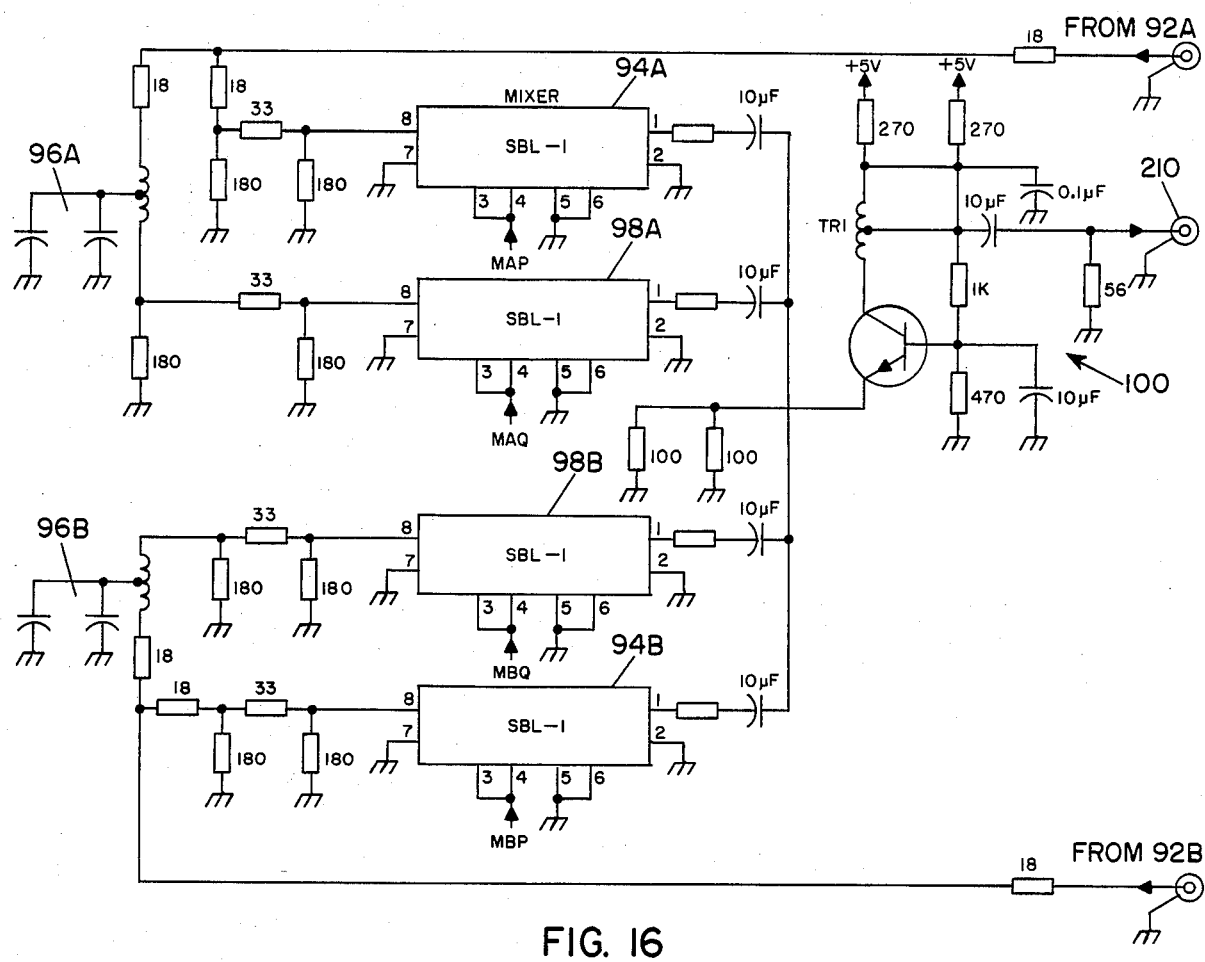
FIG. 16 is a circuit diagram of a modulator useful in a transmitter for a data communication system in accordance with the present invention.

An additional set of address inputs to memory 74 and 76 is provided by common counting circuit 82 which provides a 3 bit output counting signal. The counting circuit 82 is driven by a clock which operates at $2^3$ or 8 times the rate at which the data bits are supplied to shift register 70 and 72. Accordingly, counter 82 cycles through 8 steps for each set of input address signals provided to memory 74 or 76 by shift register 70 and 72. In order to prevent zero transistions of the QPSK signal, it will be recognized that the shifting of shift registers 70 and 72 will be clocked by clock signals which are out of phase. It should also be recognized that in order to provide proper modulating signals, the contents of memory 74 and 76 will be different, to provide a proper transistion in an offset non-zero crossing QPSK system. The memory contents may be made identical by minor adjustment (such as bit inversion) of the counter signals. Data outputs from memory 74 and 76 are provided to flip-flop circuits 75 and 77 and thereafter presented as inputs to D-to-A converters 84 and 86. The outputs of the D-to-A converters 84 and 86 comprise synthesized modulating signals, which are smoothed in low pass filters 88 and 90 before being provided as modulating signals to the modulating circuit which is shown in FIG. 16. The outputs of the low pass filter are labeled MAP and MAQ which stands for modulating A channel in-phase signal and modulating A channel quadrature phase signal. These signals are provided as inputs to modulating circuits which are shown in FIG. 16.

The programming of memories 74 and 76 is best derived for a particular transmitter/receiver combination. It should be recognized that the modulating signal can be adjusted by re-programming the memories to provide a modulating signal which has pre-conditioning such that the pre-detection output signal at the receiver satisfies the Nyquist criteria and is compensated for intersymbol interference. The compensation adjusts not only for characteristics of the filters used, but also for signal distortion effects of transmitter and receiver components, such as amplifiers, modulators, etc. In the event that such components are to be changed in a system, appropriate adjustments can be made to the memory contents.

The initial values of the memory data can be computed by computer simulation, starting from the nominal characteristic of the transmission system. Further refinement of the memory data can be achieved by using empirical measurements of transfer characteristic, the entire transmitter and receiver, and repeating computer simulation.

The modulation signal synthesizing arrangement shown in FIG. 15 is configured for QPSK modulation, but those skilled in the art will recognize that it is equally applicable to other modulating schemes such as quadrature amplitude modulation (QAM) or differential phase shift keying (DPSK). In QAM, a multiple level modulating signal can be synthesized. For DPSK a modulating signal to control a VCO can be synthesized.

The modulating circuits of FIG. 16 are provided with an A subcarrier IF signal from an IF oscillator 92A, which is not specifically shown. As previously indicated this IF local oscillator operates at a frequency of 69.479 KHz. The ocal oscillator signal is provided directly to modulator 94A and to modulator 98A by 90° phase shift circuit 96A so that the output of modulator 98A is in phase quadrature with the output of modulator 94A. Modulators 94A and 98A are provided with the offset modulating signals MAP and MAQ. The combined output signal is consequently a QPSK offset modulated component signal. The circuit shown in FIG. 16 includes a similar set of modulating circuits for the B channel in-phase and quadrature phase components labled MBP and MBQ. These modulating signals are used to modulate a 69,826 KHz local oscillator signal from a local oscillator 92B in circuits 94B and 98B and include a phase shift circuit 96B. Output circuit 100 combines the two modulated component signals from the A component and B component modulators into a composite output signal on lead 210. Those skilled in the art will recognize that in a four-subcarrier system there will be four sets of such modulators with four intermediate frequency local oscillators, each operating at a specific selected frequency as suggested above.

Figure 6:
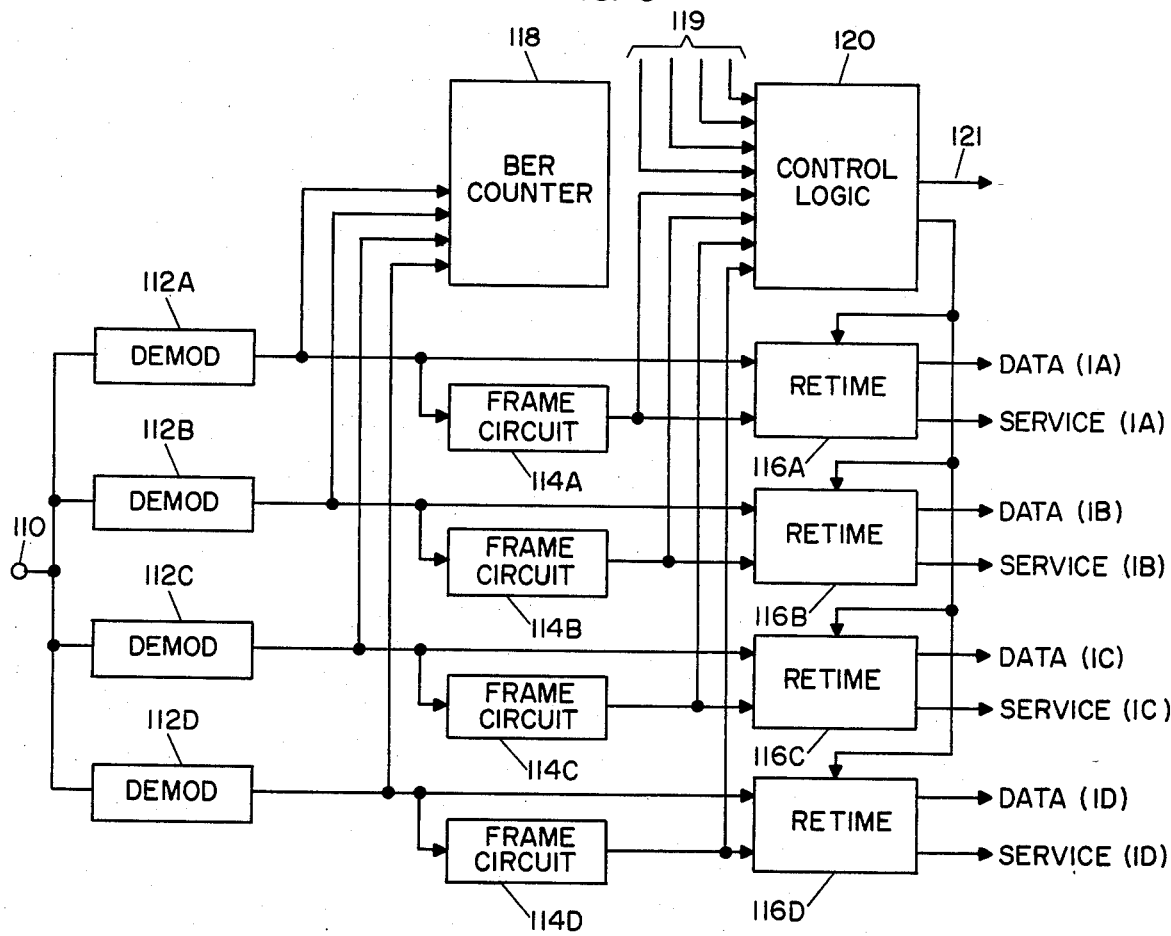
FIG. 6 is a block diagram of a receiver for a data communication system in accordance with the present invention.

FIG. 6 is a block diagram showing a typical four channel receiver useful in connection wth the preferred embodiment of the present invention. It will be understood that in a preferred system diversity is provided and two such receivers are used, one for example, for receiving signals through a first path in space, and another for receiving signals through a second path in space. The receiver illustrated in FIG. 6 does not show the antenna, low noise amplifiers and down conversion electronics, which are conventional in the art. A received composite IF signal is provided to an input terminal 110 of the receiver of FIG. 6, and thereafter directly provided to four demodulators for the four subcarrier channels. The four demodulators 112A, 112B, 112C and 112D provide output logic level signals to retiming circuits 116A through 116D and also to frame timing circuits 114A, through 114D. The frame timing circuits provide information to the retiming circuits 116, and also to control logic 120, as will be further described. The signal from demodulators 112 can also be provided to bit error rate counter 118, as will be further discussed. The demodulator 112 is of conventional design for QPSK signals and is shown in a more detailed diagram in FIG. 8. Each of the demodulators includes first and second mixers 140 and 142 which are provided with a signal from a voltage controlled local oscillator 144 operating at the same IF frequency as the subcarrier signal provided in terminal 110. To provide quadrature phase detection the local oscillator signal is passed through a 90° phase shift circuit 146 prior to being provided to mixer 142. The outputs of mixers 140 and 142 are provided to low pass filters 148 and 150, which operate at base band and provide the channel selection filtering between the subcarrier signals of the composite signal provided to terminal 110. Accordingly, a different frequency for voltage control oscillator 144 will be provided for each of the demodulators 112A through 112D shown in FIG. 6, to convert the appropriate IF signal to base band. The filtered base band signal is provided to amplifiers 152 and 154. The automatic gain control feedback of one of these amplifiers may be extracted from terminal 151 for purposes of signal selection, as will be further described. Threshold detectors 156 and 158 are used to detect the baseband logic signal, and may include an output terminal illustrated as terminal 155 for examination of the predetection signal, for purposes of determining the bit error rate, for example, by using a time shifted decision point for the eye pattern as a measure of bit error rate. The detected in-phase and quadrature phase data substream signals, indicating as P and Q in FIG. 8 is provided to differential decoding and parallel to series conversion circuitry 162 and to descrambler 164 before being provided to output terminal 166. This data is also provided as feedback to a Costa's loop circuit 160, which generates the control voltage for voltage controlled local oscillator 144, providing a phase lock to synchronize the local oscillator to the received IF signal carrier.

Figure 17:
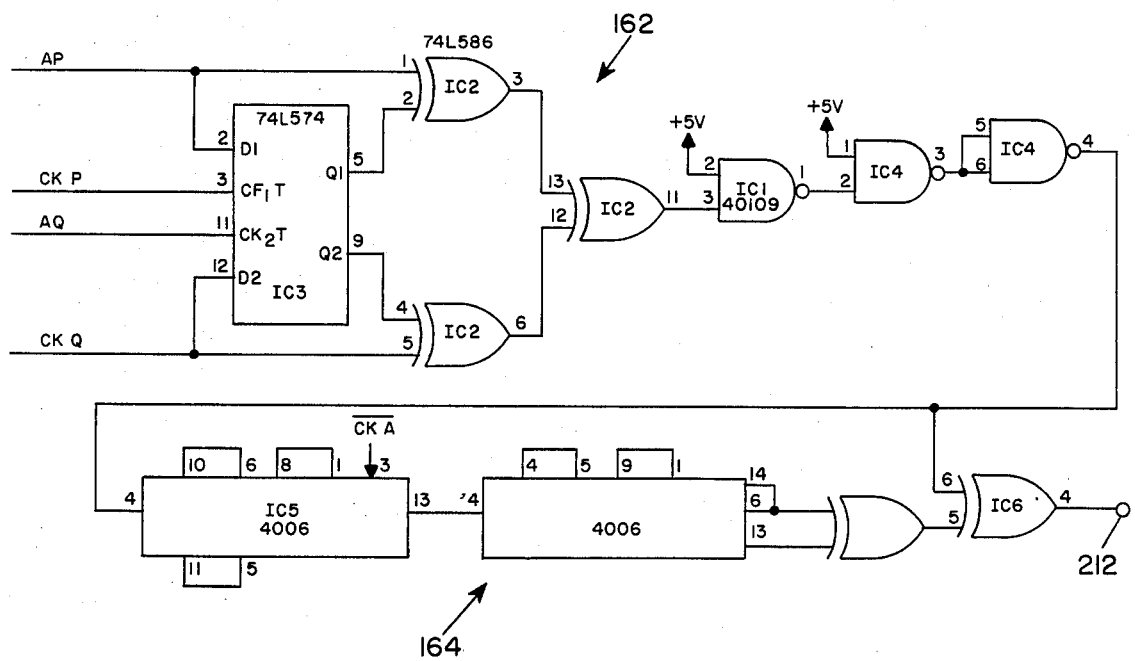
FIG. 17 is a circuit diagram of a parallel to series converter and descrambling circuit useful in a receiver for a data communication system in accordance with the present invention.

FIG. 17 is a circuit schematic diagram showing the differential decoding and parallel to series conversion and descrambling circuits, as contemplated by the blocks labeled 162 and 164 of FIG. 8. The parallel to series conversion is achieved using a flip-flop circuit in connection with logic gates. The output signal is provided to a descrambler 164 which provides an output data substream on terminal 212. The inputs to the series to parallel converter 162 include the A channel in-phase and quadrature phase received data signals, labeled AP and AQ, as well as the recovered clock signals labeled CKP and CKQ. The output from terminal 212 comprises the descrambled data signal, together with the parity and frame timing signal bits and the service channel data bits. This is provided to retiming circuit 116A shown in FIG. 6, which is shown in greater detail in FIG. 9. The retiming circuits 116 includes a pair of first-in-first-out two channel memories 168 and 169. Each of the first-in-first-out memories receives on an upper channel the signal which is output from terminal 212 of the descrambler 164 in FIG. 17. Each of the lower channels of the first-in-first-out memories 168 and 169 receives a frame timing pulse, which is generated by the frame circuits 114A, which will be later described. Separate load and unload clock signals are provided to the memories 168 and 169. The load clock signal is derived from the received data signal and gating to separate the portions of each data frame. The unload clock signals are generated by control logic 120 to provide coordinated output timing for the separated substream data and service channel data. Circuit 168 is used for the received substream data signals, and has in its lower channel the frame timing signal to coordinate the output of the unloading of the data channel. The frame timing circuit 114 responds to the frame timing bit sequence to generate a frame timing pulse, which is loaded into the lower channel of memory 168. When this signal is unloaded, it gives an indication to the logic circuitry of the position in the frame time of the data which is currently being unloaded. This information is useful in retiming the substream data, which is output from the several retiming circuits 116 at the proper time position with respect to the other data substreams and can be properly interleaved in time at the output. The data substream which is unloaded from memory 168 in FIG. 9 is provided to data selector switches which are shown in FIG. 11, as will be further described. The second memory 169 of FIG. 9 is used for separating the service channel data, and for retiming that data to interleave with other service channel data received by other demodulators. This service channel data can be separately reconstructed in correct time sequence in the same way as the main substream data with appropriate timing.

FIG. 7 is a block diagram which functionally describes the frame timing circuit 114. The received data stream from the demodulator is provided to a shift register 122 whose bits are compared to a known bit sequence supplied to terminal 126. Comparator 124 provides a frame indicating output pulse signal when the bits in the data stream correspond to the bit sequence which is used for the frame timing sequence. The output frame indicating signal is provided to a shift register 128 and to AND circuit 130. Shift register 128 has a number of steps to provide a delay corresponding to one frame of data. Accordingly, the previous and current frame indicating pulse signals from two frames are provided simultaneously to AND circuit 130, which provides an output to flywheel circuit 134. The result of this sequence is to provide an output to flywheel circuit 134 only after two successive frame timing sequences have been received at a time spacing corresponding to one frame. Accordingly random bit sequences of data which correspond to a frame sequence will be eliminated, because such random sequences will not generally occur at intervals of one frame. Flywheel circuit 134 provides continuous output signals spaced at one frame in time. The circuit will continue to provide signals even if frame timing sequences are not received, but will cease oscillation if several frame timing sequences are missing and will no longer provide frame timing signals until frame timing sequences are again received. Accordingly, the system can continue to maintain frame timing during a period when data is not being received on a particular channel, because of multipath interference or for other reasons, but after a significant number of missed frame timing sequences oscillation will discontinue until a new acquisition of the frame timing sequence on that channel.

The output frame timing signal from flywheel circuit 134 is provided to the lower channel of FIFO 168 and 169 in FIG. 9, and is used for gating the clock signals used to load retiming memories 168 and 169. This signal is provided to clock 136 for purposes of discontinuing clock pulsing during the frame timing interval and service channel interval for loading FIFO 168. Clock 136 is used as a load clock for memories 168 with respect to substream data, and discontinues clocking operation during intervals when the frame timing pulse sequence is present in the data stream and when the service channel data is present in the data stream. Accordingly, the upper channel of FIFO 168 is loading only with the data substream being transmitted by the system and not loaded with the frame timing sequence or with the service channel data. Likewise clock signals for loading FIFO 169 are provided only during portions of a frame corresponding to service channel data.

Figures 18, 20:
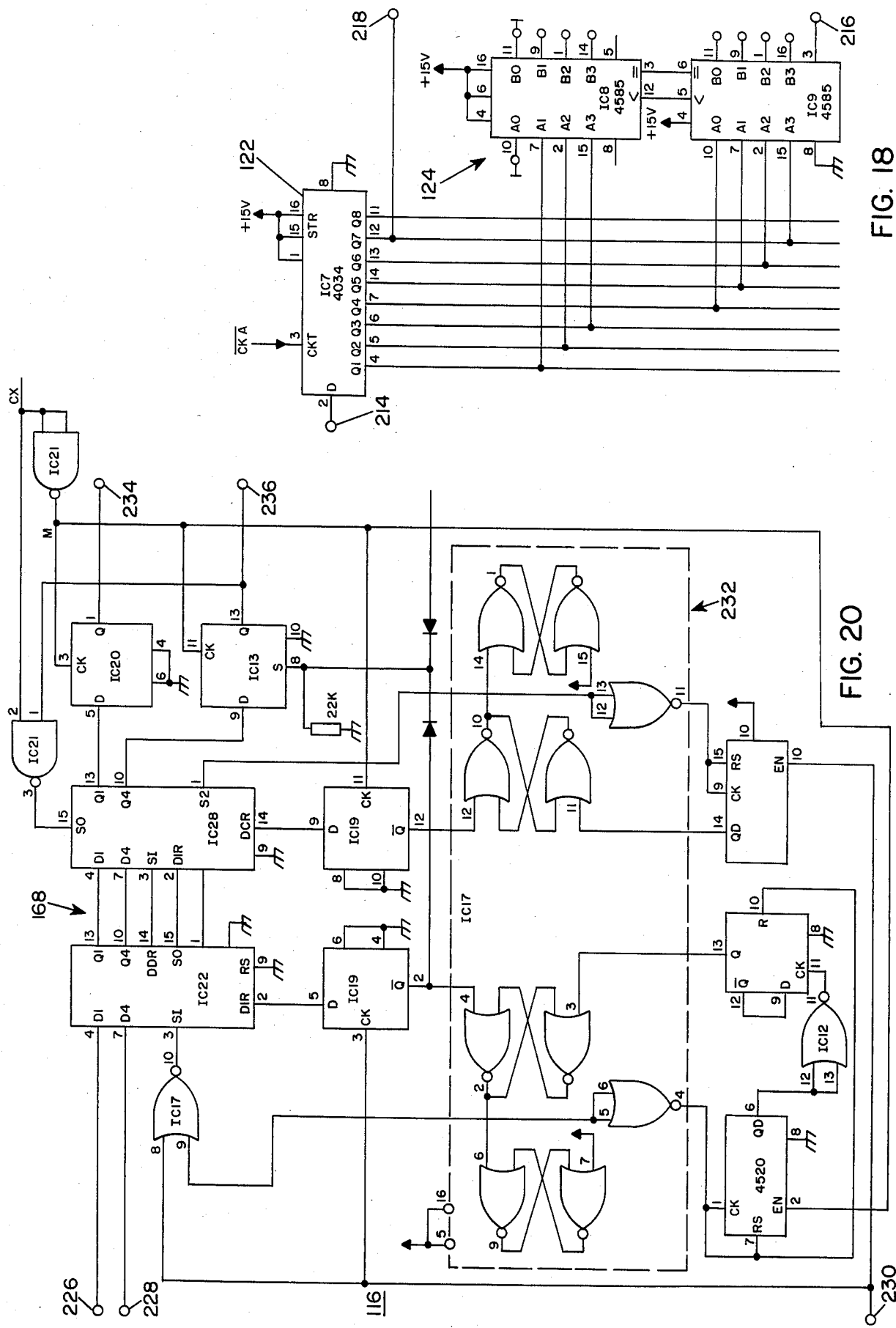
FIG. 18 is a circuit diagram of a timing signal decoding circuit useful in a receiver for a data communication system in accordance with the present invention.
FIG. 20 is a circuit diagram of a retiming circuit useful in a receiver for a data communication system in accordance with the present invention.

FIG. 18 is a schematic diagram showing the shift register 122 and comparator 124 of the frame circuit 114 shown in FIG. 7. The received stream of data is provided to input terminal 214 and is clocked through shift register 122 to output terminal 218, and thereafter supplied to first-in-first-out memory 168. Comparator 124 is used to compare the serial bits in the data stream to the sequence of bits used as a frame timing signal, and provide an output at terminal 216 in the event there is a valid comparison.

Figure 19:
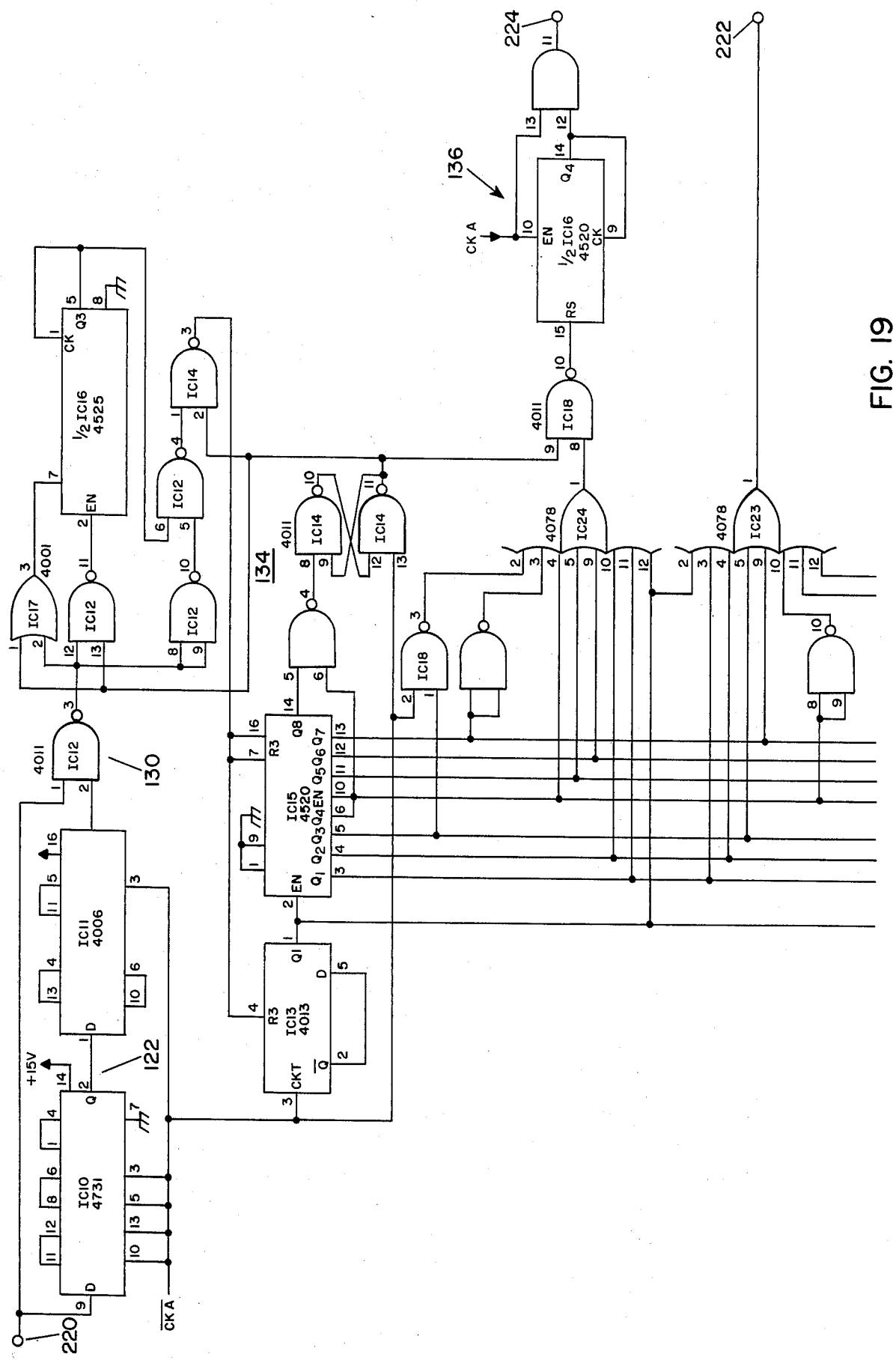
FIG. 19 is a circuit diagram of a timing arrangement useful in a receiver for a data communication system in accordance with the present invention.

FIG. 19 shows the shift register delay circuit 128, AND gate 130 and flywheel circuit 134 of the frame circuit 114 shown in FIG. 7. Also shown in FIG. 19 is a schematic diagram for the clock 136. Input terminal 220 is connected to the output terminal 216 of the comparator 124 shown in FIG. 18. Output terminal 222 is a frame timing pulse which is loaded in the lower channel of memory 168. The output at terminal 224 is a gated clock signal, which is used to load data and frame timing pulses into retiming memory 168.

FIG. 20 is a schematic diagram of the retiming logic used in connection with the receiver of the present invention, and particularly shows the first-in-first-out memory 168 of FIG. 9. The first-in-first-out memory is accomplished by using two series connected first-infirst-out integrated circuits. Appropriate logic circuit are provided for gating the input and outputs so that the data which is supplied to input terminal 226 is clocked through the memory, retimed and provided to output terminal 234. Likewise a pulse derived from the frame timing data sequence by the circuit shown in FIG. 19 is supplied to input terminal 228 and supplied as a retimed signal to output terminal 236, for purposes of identifying the position of the data on output terminal 234 with respect to the data frame. Input terminal 230 of the circuit 116 of FIG. 20 is connected to the clock output 224 from clock 136 in FIG. 19. Logic circuitry 232 is provided for the eventuality that the data in memory 168 is overloaded, and provides a shift right or shift left when the memory is either full or empty.

As previously stated, it will be understood that two complete receivers of the type shown in FIG. 6 are provided for a system which uses, for example, space diversity in providing two separate transmission paths from a transmitter to a receiver for purposes of signal diversity. It is also understood that control logic 120 is a common part for two or more receivers. Accordingly, logic 120 receives frame timing signals from a second receiver by leads 119 and supplies control signals to the retiming circuits thereof by lead 121. FIG. 11 is a block diagram indicating the recombining circuit for use in a system wherein data signals are transmitted in parallel on four substreams, each being sent on a separate subcarrier of a composite signal, and wherein each of the substreams is received by a separate receiver circuit, as shown in FIG. 6, after transmission over a different channel, for example, by space diversity. In this case, 8 data substreams will be provided, four labeled A, B, C and D from a first receiver and four labeled A, B, C, D from a second receiver. These signals have been identified in FIG. 11 as "DATA 1A", "DATA 2A", etc. In accordance with the switching arrangement of FIG. 11, output data is selected for each substream from one of the receivers, according to the quality of the received signal for that substream. Accordingly, there is diversity provided for each substream of data, to provide improved resistance to frequency selective fading, which may affect one substream of data at a lower frequency, for example, f1, and not affect the reception of a data substream on a different subcarrier, for example, f3. Accordingly, for each subcarrier, and consequently each substream of data, the best data path from the first or second receiver is selected. Comparators 174A through 174D are provided to compare the quality of the substream data for each of the receivers, for example, by comparison of the derived bit error rate from terminal 155, or the comparison of the automatic gain control feedback signal from amplifier 152, as detected at port 151 in FIG. 8. Comparators 174 select the best receiver number 1 or number 2 for each substream A, B, C and D, based on the quality of the signal received only in a particular substream. The results of this selection are provided to four separate switches 176A, 176B, 176C and 176D. Switches 176 select a data substream from either the first or the second receiver, and provide that data substream to retiming circuit 178, which in the illustrated embodiment is a shift register, which provides the original data stream as serial output data, in the illustrated embodiment at 2048 kilobits per second.

As an alternate to having a separate timing circuit 178, it is possible to provide the output clock to memory circuits 168 at the higher data speed, so that data is clocked out of memories 168 at a speed and at a time appropriate for recombining the data stream into the original serial stream of digital data which was provided at the transmitter.

While there have been described what is considered to be the preferred embodiment of the present invention, those skilled in the art will recognize that other and further modifications may be made thereto without departing from the spirit of the invention, and it is intended to claim all such changes and modifications as fall within the true scope of the invention.

We claim:

1. A system for transmission and reception of a serial stream of digital data from a first location to a second location comprising:
    means at said first location for converting said serial data stream into a number N of first parallel data substreams;
    a number N of modulators at said first location for modulating a plurality of component signals each with one of said parallel data substreams;
    means for transmitting said modulated component signals to said second location, each of said component signals being transmitted on at least two transmission channels;
    a plurality of at least 2 N demodulators at said second location, each for demodulating a component signal from one of said transmission channels;
    switching means at said second location for selecting the output of one of said demodulators for each of said modulated component signals, to derive a number N of second parallel data substreams, each corresponding to one of said first data substreams;
    means for converting said N second parallel data substreams into an output serial data stream.

2. A system as specified in claim 1 wherein said modulators modulate a plurality of component signals, each having a selected frequency within a frequency band.

3. A system as specified in claim 1 wherein said means for transmitting said modulated component signals to said second location comprises means for transmitting a composite signal derived from said component signals.

4. A system as specified in claim 3 wherein said modulators modulates a plurality of component signals, each comprising different frequency within a selected frequency band, and wherein said transmitting means transmits a composite signal comprising said component signals as subcarriers.

5. A system as specified in claim 1 wherein said transmission channels comprise channels having different transmission paths in space.

6. A system as specified in claim 1 wherein said transmission channels comprise transmissions at different frequency bands.

7. A system as specified in claim 1 wherein said transmission channels comprise transmissions with different polarities.

8. A system as specified in claim 1 wherein there are further provided means at said second location for generating signals representative of the amplitude of each of said component signals from each of said transmission channels, and wherein said switching means is responsive to said amplitude representative signals.

9. A system as specified in claim 1 wherein there are further provided means at said second location for generating signals representative of the bit error rate for each of said component signals from each of said transmission channels, and wherein said switching means is responsive to said bit error rate representative signals.

10. A receiver for use in a system having at least two different transmission channels for receiving a plurality of N component signals, each of which is transmitted on at least two of said channels, said component signals having modulation corresponding to N parallel data substreams, comprising:

at least N first demodulators, each coupled to receive one of said component signals from one of said channels and to provide at least N first output data substreams;

at least N second demodulators, each coupled to receive one of said component signals from another of said channels and to provide at least N second output data substreams; and switching means for selecting one of said first or second output data substreams for each of said N parallel data substreams in accordance with the component signals for each of said N parallel data substreams on each of said transmission channels.

11. A receiver as specified in claim 10 further including means for generating signals representative of the amplitude of each of said component signals on each of said channels, and wherein said switching means is responsive to said amplitude representative signals.

12. A receiver as specified in claim 10 further including means associated with each of said first and second demodulators for generating signals representative of the bit error rate for each of said first and second output data substreams, and wherein said switching means is responsive to said bit error rate representative signals.

13. A system for transmission and reception of a serial stream of digital data from a first location to a second location, comprising:

means at said first location, responsive to said serial data stream, for forming a plurality of N parallel data substreams, each of said substreams comprising a series of data frames, each of said data frames including a data frame timing signal and a predetermined quantity of digital data;

N modulators at said first location, each for modulating a component signal with one of said N data substreams;

means for transmitting said modulated component signals to said second location;

N demodulators at said second location for demodulating said modulated component signals to derive therefrom said N parallel data substreams;

means responsive to said frame timing signals in said demodulated data substreams for retiming said digital data in said substreams; and means responsive to said retimed substream digital data for generating an output serial stream of digital data.

14. A system as specified in claim 13 wherein said means for forming said data substreams forms said substreams with frame timing signals comprising a selected sequence of digital bits, said sequence being the same for all frames in a substream.

15. A system as specified in claim 14 wherein said retiming means includes a comparator for comparing the digital bits in each of said substreams to said selected sequence.

16. A system as specified in claim 15 wherein said retiming means includes means responsive to said timing signals in sequential data frames.

17. A system as specified in claim 13 wherein said retiming means includes a first-in-first-out memory for digital data having separate data-in and data-out clock inputs.

18. A system as specified in claim 17 wherein said memory has a first memory channel for data signals, a second memory channel for signals derived from said frame timing signals, and a third memory channel for service channel.

19. In a system for transmission of a stream of digital data between remote locations, said system having signal filtering characteristics, signal forming apparatus, comprising:

a register for storing digital data bits in said data stream in an arrangement corresponding to the order of said bits in said stream;

a counter, responsive to supplied clock signals;

a programmed digital data memory having first address inputs coupled to said register and second address inputs coupled to said counter and having programmed data values corresponding to sequential values of a synthesized modulating signal, said data values being selected to provide a synthesized modulating signal with a Fourier Transform dependent on said data bits in said register which compensate for said signal filtering characteristics; and a digital to analog converter responsive to data values from said memory.

20. Signal forming apparatus as specified in claim 19 wherein said data stream comprises digital data bits at a bit-clock rate and wherein said register comprises a shift register clocked at said bit clock rate.

21. Signal forming apparatus as specified in claim 20 wherein said counter is an M-bit digital counter, and wherein said supplied clock signals occur at a rate which is $2^M$ times said bit-clock rate.

22. Signal forming apparatus as specified in claim 19 wherein said signal filtering characteristics include spectral amplitude and group delay characteristics, and wherein said memory has data values selected to compensate for said spectral amplitude and group delay characteristics.

23. In a system for transmitting a stream of digital data between remote locations, said system having signal filtering characteristics, a modulator for modulating a supplied carrier with said data, comprising:

a register for storing digital data bits in said data stream in an arrangement corresponding to the order of said bits in said stream;

a counter, responsive to supplied clock signals;

a programmed digital data memory having first address inputs coupled to said register and second address inputs coupled to said counter and having programmed data values corresponding to sequential values of a synthesized modulating signal, said data values being selected to provide a synthesized modulating signal with a Fourier Transform dependent on said data bits in said register which compensate for said signal filtering characteristics;

a digital to analog converter responsive to data values from said memory for generating a modulating signal; and a modulator for modulating said carrier with said modulating signal.

24. Modulating apparatus as specified in claim 23 wherein said data stream comprises digital data bits supplied at a bit-clock rate and wherein said register comprises a shift register clocked at said bit clock rate.

25. Modulating apparatus as specified in claim 24 wherein said counter is an M-bit digital counter, and wherein said supplied clock signals occur at a rate which is $2^M$ times said bit-clock rate.

26. Modulating apparatus as specified in claim 23 wherein said signal filtering characteristics include spectral amplitude and group delay characteristics, and wherein said memory has data values selected to compensate for said spectral amplitude and group delay characteristics.

27. A system for transmission and reception of a serial stream of digital data from a first location to a second location and having signal filtering characteristics, comprising:
  (1) means at said first location responsive to said serial data stream, for forming a plurality of N parallel data substreams, each of said substreams comprising a series of data frames, each of said data frames including a data frame timing signal and a predetermined quantity of digital data;
  (2) at least N modulators, each comprising:
    (a) a register for storing digital data bits in one of said substreams in an arrangement corresponding to the order of said bits in said substream;
    (b) a counter, responsive to supplied clock signals;
    (c) a programmed digital data memory having first address inputs coupled to said register and second address inputs coupled to said counter and having programmed data values corresponding to sequential values of a synthesized modulating signal, said data values being selected to provide a synthesized modulating signal with a Fourier Transform dependent on said data bits in said register which compensate for said signal filtering characteristics;
    (d) a digital to analog converter responsive to data values from said memory; and
    (e) means for modulating a supplied component signal with said synthesized modulating signal;
  (3) means for transmitting said modulated component signals to said second location;
  (4) N demodulators at said second location for demodulating said modulated component signals to derive therefrom said N parallel data substreams;
  (5) means responsive to said frame timing signals in said demodulated data substreams for retiming said digital data in said substreams; and
  (6) means responsive to said retimed substream digital data for generating an output serial stream of digital data.

28. A system as specified in claim 27 wherein said means for forming said data substreams forms said substreams with frame timing signals comprising a selected sequence of digital bits, said sequence being the same for all frames in a substream.

29. A system as specified in claim 28 wherein said retiming means includes a comparator for comparing the digital bits in each of said substreams to said selected sequence.

30. A system as specified in claim 29 wherein said retiming means includes means responsive to said timing signals in sequential data frames.

31. A system as specified in claim 27 wherein said retiming means includes a first-in first-out memory for digital data having separate data-in and data-out clock inputs.

32. A system as specified in claim 31 wherein said memory has a first memory channel for data signals and a second memory channel for signals derived from said frame timing signals.

33. A system as specified in claim 27 wherein each of said data substreams comprises digital data bits at a bit-clock rate and wherein each of said registers comprises a shift register clocked at said bit clock rate.

34. A system as specified in claim 33 wherein each of said counters is an M-bit digital counter, and wherein said supplied clock signals occur at a rate which is $2^M$ times said bit-clock rate.

35. A system as specified in claim 27 wherein said signal filtering characteristics include spectral amplitude and group delay characteristics, and wherein each of said memories has data values selected to compensate for said spectral amplitude and group delay characteristics.

* * * * *